United States Patent [19]

Peddinghaus

[11] Patent Number: 4,632,365
[45] Date of Patent: Dec. 30, 1986

[54] APPARATUS FOR THE TORCH CUTTING OF A STEEL STRUCTURAL SHAPE

[76] Inventor: Rolf Peddinghaus, Deterbergerstr. 25, 5828 Ennepetal, Fed. Rep. of Germany

[21] Appl. No.: 834,797

[22] Filed: Feb. 28, 1986

[30] Foreign Application Priority Data

Feb. 28, 1985 [DE] Fed. Rep. of Germany ....... 3507087

[51] Int. Cl.$^4$ .............................................. B23K 7/00
[52] U.S. Cl. ..................................................... 266/48
[58] Field of Search ........................................... 266/48

[56] References Cited

U.S. PATENT DOCUMENTS 4,094,339 6/1978 Leisner et al. ......................... 266/48
4,390,167 6/1983 Ito et al. ................................. 266/48

Primary Examiner—Wayland Stallard
Attorney, Agent, or Firm—Karl F. Ross; Herbert Dubno

[57] ABSTRACT

An apparatus for cutting a steel profile, profile bar, and the like comprises a roller conveyor, at least one driven feed roller, a cutting torch mounted behind the driven feed roller in a positive feed direction, and a burr removal device. A workpiece lying on a roller press is movable in both the positive and the negative feed direction. The cutting torch is movable transverse to the feed direction. The burr removal device comprises a burr-removal shaft with a milling member, which is mounted behind the driven feed roller in the positive feed direction. The burr-removal shaft extends over the entire width of the roller conveyor.

8 Claims, 5 Drawing Figures

APPARATUS FOR THE TORCH CUTTING OF A STEEL STRUCTURAL SHAPE

FIELD OF THE INVENTION

My present invention relates to an apparatus for cutting an elongated metal workpiece and, more particularly, to an apparatus for cutting a flat bar, a steel profile, a profile bar, or the like, hereinafter referred to as a steel structural shape, with a cutting torch.

BACKGROUND OF THE INVENTION

An apparatus for cutting a steel plate profile, profile bar, or the like can comprise a roller conveyor, at least one driven feed roller, a cutting torch mounted behind (downstream of) the driven feed roller in the positive or forward feed direction, and a burr or torch-flashing removal device.

A workpiece lying on the rolling-conveyor bed is movable both in the positive feed direction and the negative (rearward) feed direction, while the cutting torch is movable transversely to both feed directions.

Furthermore the burr removal device is mounted under the workpiece to be cut. A workpiece to be cut is held sufficiently rigidly on the roller bed, for example with the usual devices. By the positive feed direction is meant the principal direction in which the workpiece moves through the apparatus. The negative feed direction is the opposite direction and corresponds to comparatively small backwards motions required during operation.

Motion in the positive feed direction, the negative feed direction, and a transverse adjustability in the position of the burner torch are required for the cutting work. Any of the guiding motions required for cutting and cutting shapes can be made or generated with these degrees of freedom available.

Thus pieces can be cut out of the workpiece, for example rectangular pieces. However during cutting a so-called burr "beard" or torch flashing arises on the underside of the workpiece. This irregular formation is sufficiently large so that upon negative feed motion of the workpiece it encounters the driven feed roller and in many ways disturbs and impairs the precision of the feed.

An apparatus for cutting a steel section, profile bar and the like is described in German utility model DE-GM No. 83 30 463. Here the burr removal mechanism is equipped with nozzles, which direct a pressurized fluid or gaseous medium on the place where the burrs occur. The burrs are acted upon by the pressurized medium in the fluid state and so to speak are blasted away. This technique leads to troubling contamination of the entire apparatus; chiefly much spattering occurs. It is especially disturbing that no smooth surface is formed where the burrs are blasted away by the pressurized medium.

OBJECTS OF THE INVENTION

It is an object of my invention to provide an improved apparatus for cutting a steel profile, a profile bar, or like workpiece whereby the aforedescribed disadvantages are avoided.

It is another object of my invention to provide an improved apparatus for cutting a steel profile, a profile bar, or like workpiece, in which the burr pieces are easily removed from the cut workpiece without contaminating or interfering with the cutting apparatus.

It is yet another object of my invention to provide an improved apparatus for cutting a steel profile, a profile bar, or like workpiece, in which the burr pieces, as far as they interfere with negative feed operations, are removed efficiently to provide smooth, clean workpiece surfaces.

SUMMARY OF THE INVENTION

These objects and others, which will become more readily apparent hereinafter, are attained in accordance with my invention in an apparatus for cutting a steel profile, profile bar, or like workpiece comprising a roller conveyor at least one driven feed roller, a cutting torch mounted downstream of the driven feed roller in the positive or main forward or advance feed direction, and a burr removal device.

A workpiece lying on the roller conveyor is movable both in the positive feed and negative feed directions, while the cutting torch is movable transversely to both feed directions. Furthermore the burr removal device is positioned so as to be underneath the workpiece to be cut.

According to my invention the burr removal device comprises a burr-removal or filing shaft with a milling member, which is mounted downstream of the driven feed roller in the positive feed direction or upstream thereof in the negative feed direction. The burr-removal shaft, machining the underside of the workpiece, is located between the driven feed roller and the torch. The burr-removal shaft extends over the entire width of the roller conveyor. The burr-removal shaft can be driven by a roller conveyor drive, which also drives the roller conveyor and/or the feed roller.

In another embodiment of my invention the burr-removal shaft is driven by its own burr-removal shaft drive, and is driven with a rotary speed independent of the roller conveyor speed and adjustable independently as well.

Also according to my invention the burr-removal shaft has a circumferential helical, screw threadlike milling member, and is constructed as a feed screw for removing the burrs and displacing the material removed to one side of the machine.

In order to perform the milling process effectively, and of course to provide a product with smooth surfaces without contamination, the milling member is equipped with milling grooves or milling teeth over the entire length of the burr-removal shaft and which may be angularly spaced about the axis thereof and/or axially spaced along the shaft.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
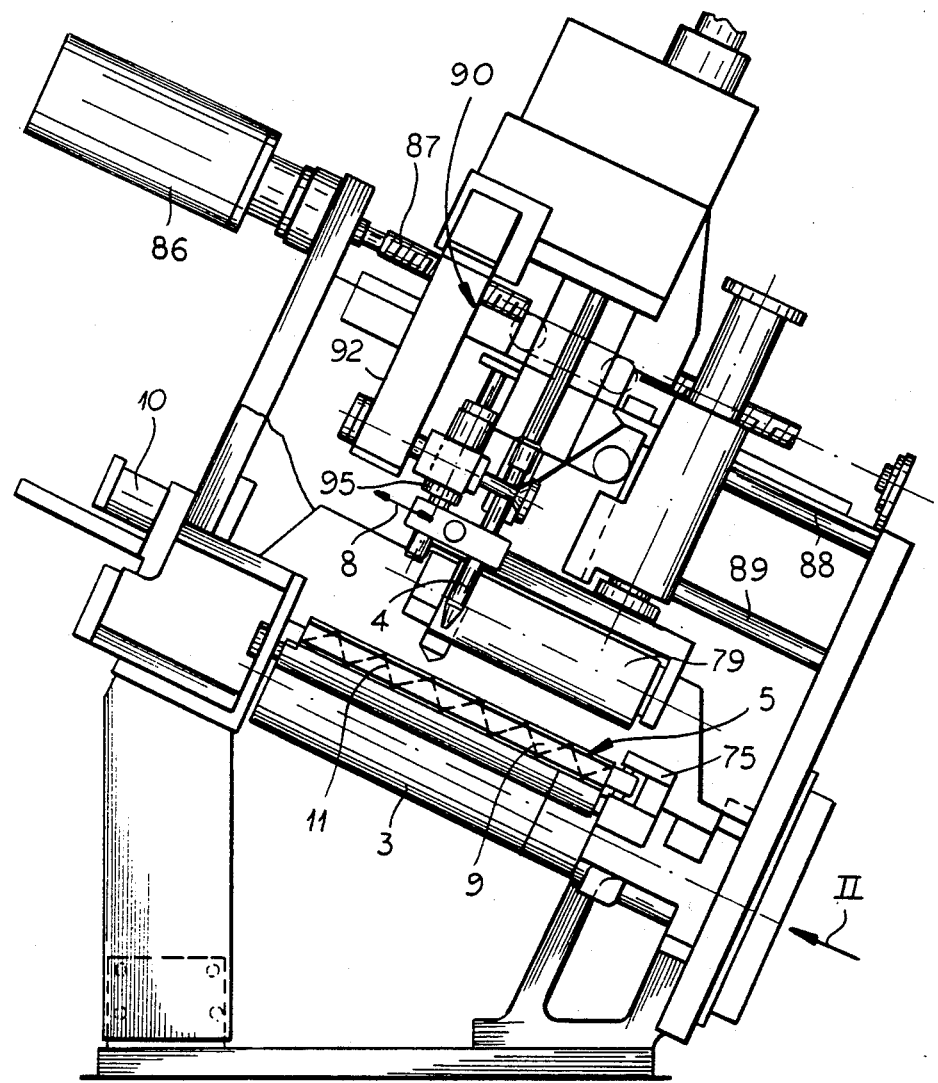
FIG. 1 is a front, elevational view of an apparatus for cutting a steel profile, profile bar, or a similar workpiece according to my invention showing the device for feeding a workpiece.
Figure 2:
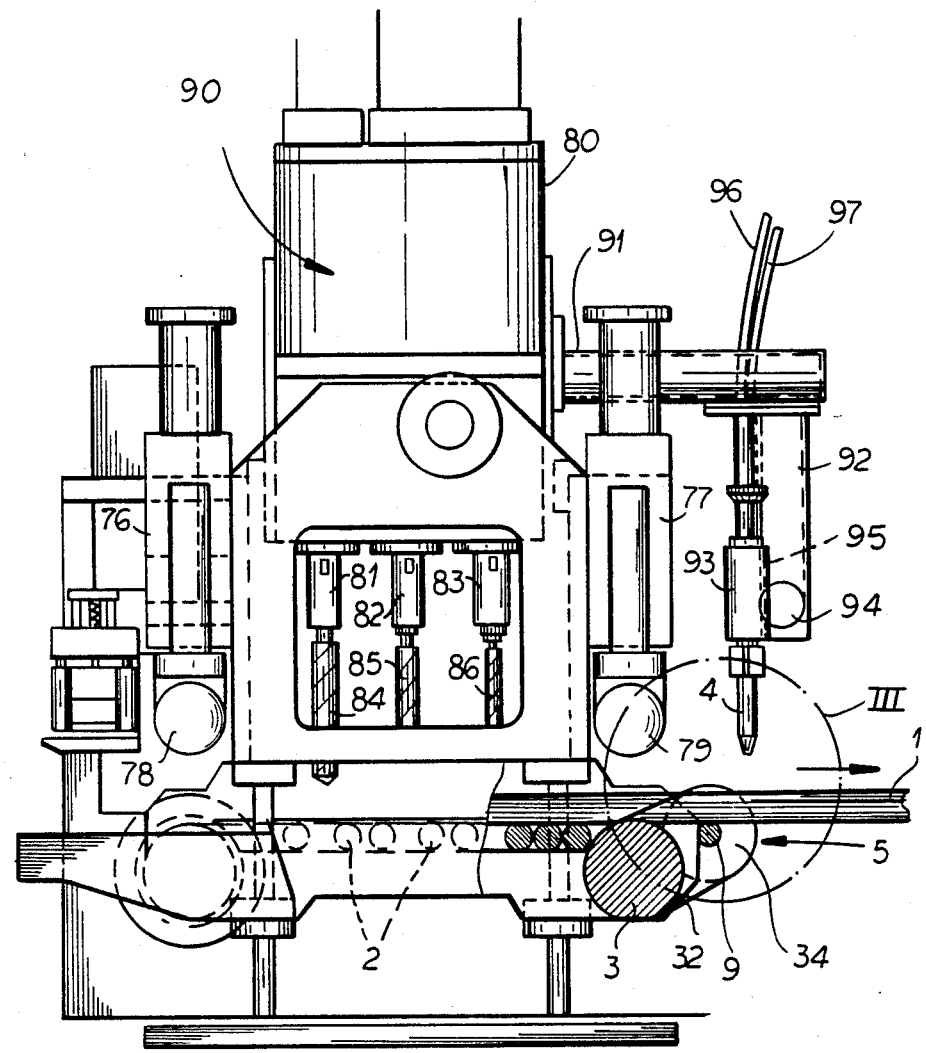
FIG. 2 is a partially broken away view of the apparatus of FIG. 1 in the direction shown by the arrow II in FIG. 1.
Figure 3:
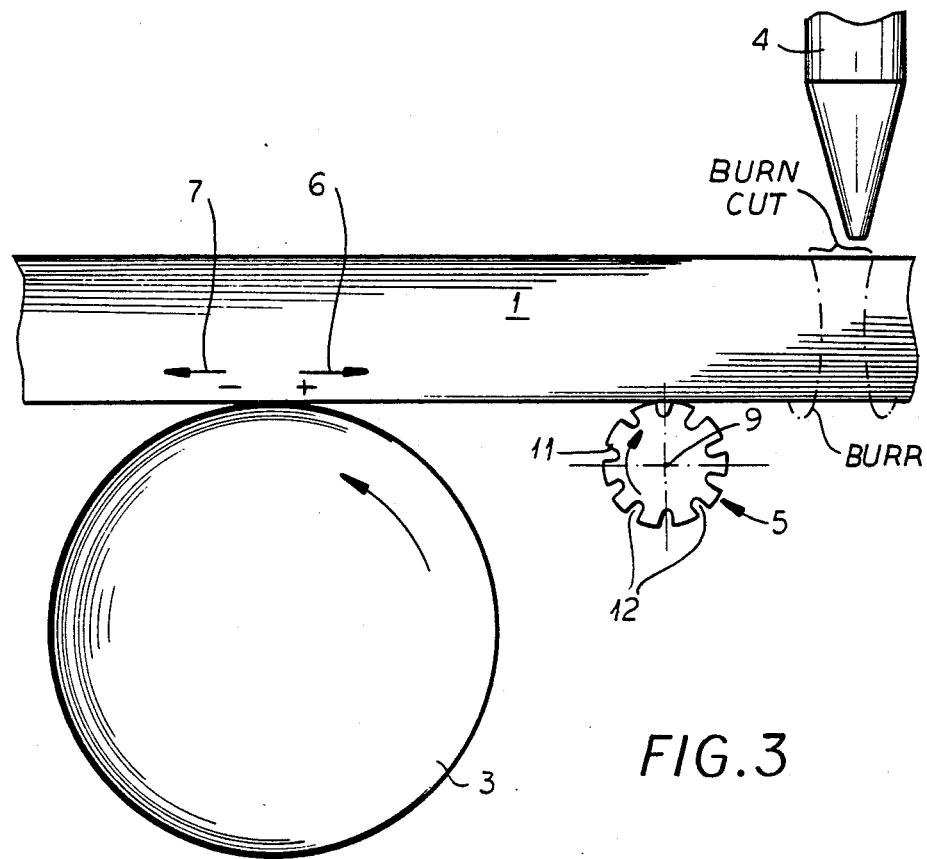
FIG. 3 is a substantially magnified view of a part of the apparatus of FIG. 1 indicated by the dot-dashed circle III in FIG. 2.

The apparatus shown in FIGS. 1 to 3 designed for cutting a steel profile, profile bar, and like workpiece 1 comprises a roller conveyor 2, defining a workpiece path, at least one driven feed roller 3, a cutting torch 4 mounted behind the driven feed roller 3 in the positive feed direction, as shown by the arrows in FIG. 3, and a burr removal device 5. A workpiece 1 lying on the roller bed 2 is movable both in the positive and negative feed direction as shown by the arrows 6 and 7 respectively in FIG. 3.

The cutting torch 4 can be moved transversely to the feed directions 6 and 7, as shown by the double arrow 8 in FIG. 1. The arrow 6 indicates the positive feed direction, which is the principal direction that the workpiece 1 is moved during a cutting operation. The arrow 7 indicates the negative feed direction. The double arrow 8 clearly shows the lateral adjustability of the cutting torch 4.

In the embodiment shown the torch 4 can be mounted on a head 90 of a machine used to drill the web of a girder, plate or other steel structural shape. In this case a bar 91 carries a guide 92 upon which the torch roller 93 is vertically displaceable independently of the head by a pinion 94 meshing with a rack 95 formed on the holder 93. If the torch is an oxyacetylene torch, the gases can be supplied by the lines 96, 97. The head 90 is transversely displaceable on rails 89, 88 by a threaded spindle 87 driven by a motor 86 which can be synchronized with a motor 10 driving the roller bed 2 and the feed roller 3 to provide the desired torch-cut pattern or to position workpieces with respect to one or more of the drills 84, 85, 85 whose spindles 81, 82, 83 are driven by a motor 80 in the head and which can be individually lowered. The head is provided with pressure rollers 78, 79 which can be advanced by cylinders 76, 77 to press against a workpiece on the conveyor 2. Since the hole drilling operations are known in the art, these need not be described. The roller conveyor 2 is inclined (FIG. 1) so that the workpiece is always positively positioned against a stop 75 flanking the transport path.

Particularly from a comparative consideration of FIGS. 2 and 3 one sees, that the burr removal device 5 comprises a burr-removal shaft 9 with a milling cutter 11, which is mounted on the positive feed direction 6 behind the driven feed roller 3 (or in front of the driven feed roller 3 in the negative feed direction 7).

In the embodiment of FIGS. 1-3 the drive 10 is coupled with the roller conveyor 2 and the drive roller 3. The burr-removal shaft 9 has a shaft wheel 34 attached to it and is coupled to the driven feed roller 3 or the roller conveyor by a belt 32. In this way the motion of the roller conveyor 2 is coupled with the motion of the burr-removal shaft 9.

In FIG. 1 the burr-removal shaft 9 is seen to extend over the entire width of the roller conveyor 2. The burr-removal shaft 9 has a circumferential, helical, screw threadlike milling member 11. In addition to acting as a filing or brushing member the milling member 11 also functions as a feed screw for the burr pieces formed by the cutting operation. The burr pieces are also subjected to the force of gravity, which helps remove them from the cutting area. The milling member 11 has a plurality of milling grooves 12 distributed over its entire length in the embodiment shown in FIGS. 1-3. The burr-removal shaft 9 is mounted behind the driven feed roller 3 in the positive feed direction 6.

Figure 4:
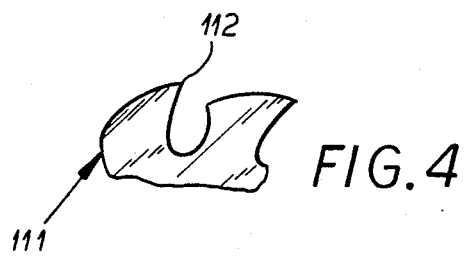
FIG. 4 is a fragmentary end view of a milling cutter workpiece according to my invention.

A second embodiment of my invention is shown in FIG. 4. Here the milling member 111 has a plurality of cutting teeth 112 distributed over its entire length instead of cutting grooves as in the previous embodiment. The burr-removal shaft 109 is mounted behind the driven feed roller in the positive feed direction near where the cutting torch operates. The balance of this embodiment is identical to the embodiment of FIGS. 1 to 3.

Figure 5:
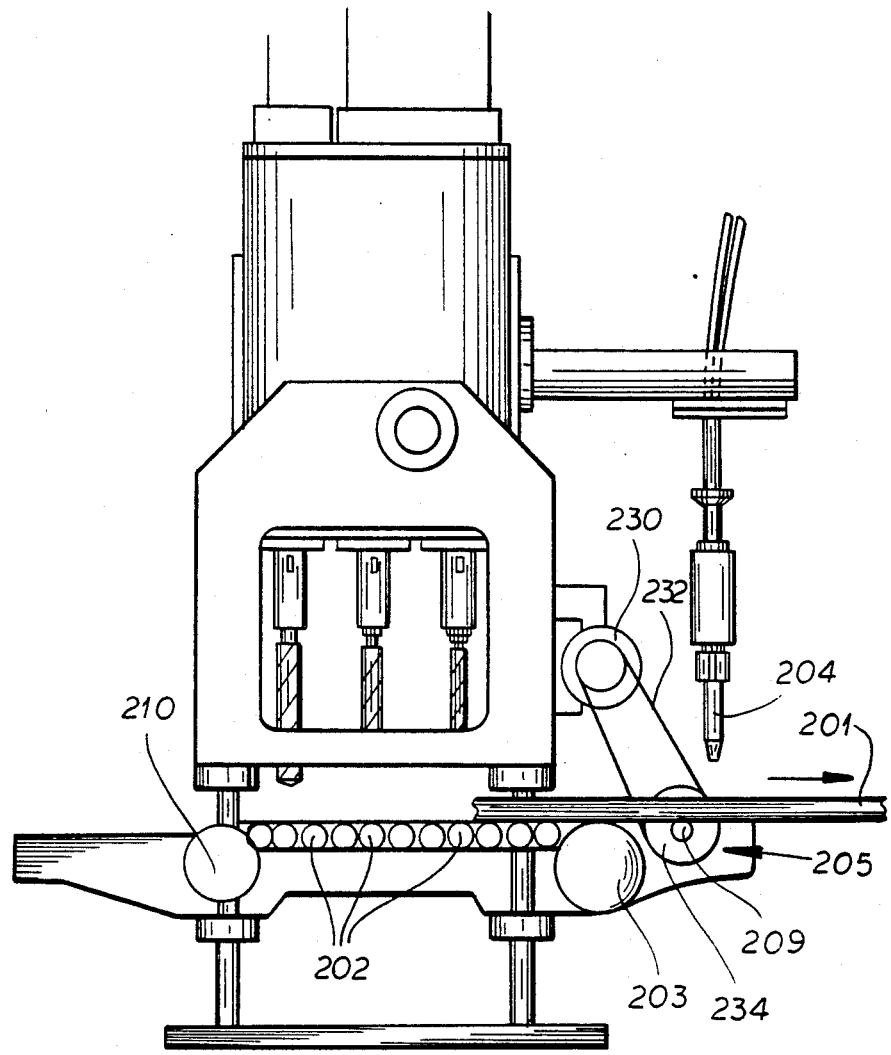
FIG. 5 is a partially broken away view of yet another embodiment of an apparatus for cutting a steel profile, profile bar, or similar workpiece according to my invention similar to FIG. 2.

In a third embodiment shown in FIG. 5 the burr removal device 205 is uncoupled from the drive 210 for the roller conveyor 202 and the driven feed roller 203, so that the burr-removal shaft 209 can be driven at a rotational speed which is different from the rotary speed of the roller conveyor 202. Details of the drive device for the burr removal device 205 include a burr-removal shaft 209 extending over the entire width of the roller conveyor 202 having a shaft wheel 234 attached thereto. A belt 232 is used to couple variable speed drive 230 with the shaft wheel 234. The balance of the embodiment is the same as the embodiment of FIGS. 1-3.

I claim:

1. In an apparatus for cutting a steel structural shape workpiece, comprising a roller conveyor, at least one driven feed roller, a cutting torch mounted behind said driven feed roller in a positive feed direction, and a burr removal device, wherein said workpiece, when lying on said roller conveyor, is movable in said positive feed direction and a negative feed direction opposite to said positive feed direction, and said cutting torch is movable transversely to said positive and said negative feed directions, and wherein further said burr removal device is positioned so as to be under said workpiece, the improvement wherein said burr removal device comprises a burr-removal shaft with a milling member, which is mounted downstream of said driven feed roller in said positive feed direction, and said burr-removal extends over the entire width of said roller conveyor.

2. The improvement according to claim 1 wherein said burr-removal shaft is connected to a roller conveyor drive, which is also connected to and drives said roller conveyor.

3. The improvement according to claim 1 wherein said burr-removal shaft is connected to a burr-removal shaft drive, and is driven with a rotational speed independently of the speed of said roller conveyor.

4. The improvement according to claim 1 wherein said burr-removal shaft has a helical formation forming a feed screw.

5. The improvement according to claim 4 wherein a plurality of milling grooves are disturbed over the length of said milling member.

6. The improvement according to claim 4 wherein a plurality of milling teeth are distributed over the length of said milling member of said burr-removal shaft.

7. An apparatus for cutting a steel structural shape workpiece which comprises:
a roller bed;

at least one driven feed roller;

a cutting torch mounted behind said driven roller in a positive feed direction; and a burr-removal shaft with a milling member, said burr-removal shaft being mounted behind said feed roller in said positive direction, said burr-removal shaft extending over the entire width of said roller conveyor, and said burr-removal shaft being positioned so as to be under said workpiece and remove torch flashing produced by said torch.

8. The apparatus defined in claim 7 wherein said burr-removal shaft has a circumferential, helical screw thread formation forming a feed screw.

* * * * *